(12) United States Patent
Nakahira et al.

(10) Patent No.: US 12,143,918 B2
(45) Date of Patent: Nov. 12, 2024

(54) WIRELESS COMMUNICATION SYSTEM, BASE STATION, AND WIRELESS COMMUNICATION METHOD

(71) Applicant: Nippon Telegraph and Telephone Corporation, Tokyo (JP)

(72) Inventors: Toshiro Nakahira, Musashino (JP); Hirantha Abeysekera, Musashino (JP); Koichi Ishihara, Musashino (JP); Tomoki Murakami, Musashino (JP); Takafumi Hayashi, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 391 days.

(21) Appl. No.: 17/631,575

(22) PCT Filed: Aug. 7, 2019

(86) PCT No.: PCT/JP2019/031063
§ 371 (c)(1),
(2) Date: Jan. 31, 2022

(87) PCT Pub. No.: WO2021/024401
PCT Pub. Date: Feb. 11, 2021

(65) Prior Publication Data
US 2022/0279426 A1 Sep. 1, 2022

(51) Int. Cl.
*H04W 48/06* (2009.01)
*H04W 48/18* (2009.01)
*H04W 72/21* (2023.01)

(52) U.S. Cl.
CPC ........... *H04W 48/06* (2013.01); *H04W 48/18* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 2008/0031212 A1* | 2/2008 | Ogura | ................... | H04W 28/16 370/338 |
| 2014/0003350 A1* | 1/2014 | Liu | ....................... | H04W 12/08 370/328 |
| 2016/0353320 A1* | 12/2016 | Hongo | .................... | H04L 12/28 |

FOREIGN PATENT DOCUMENTS

| | | |
|---|---|---|
| JP | 2008042451 | 2/2008 |
| JP | 2016220164 | 12/2016 |
| JP | 2018107508 | 7/2018 |

OTHER PUBLICATIONS

LAN/MAN Standards Committee of the IEEE Computer Society, "Part 11: Wireless LAN Medium Access Control (MAC) and Physical Layer (PHY) Specifications," IEEE Std 802.11-2016 (Revision of IEEE Std 802.11-2012) IEEE Standard for Information technology—Telecommunications and information exchange between systems Local and metropolitan area networks—Specific requirements, Dec. 14, 2016, 3534 pages.

* cited by examiner

*Primary Examiner* — Hong S Cho
(74) *Attorney, Agent, or Firm* — Fish & Richardson P.C.

(57) ABSTRACT

A wireless communication system includes a base station to which a plurality of terminal stations are connectable and a control unit that controls the base station. The base station includes a collection unit that collects terminal station information indicating terminal stations each having issued a connection request to the base station, an information processing unit that causes a storage unit to store connected terminal station information indicating, among the terminal stations indicated by the terminal station information, the terminal station currently being connected to the base sta- (Continued)

tion, a network communication unit that receives, from the control station, base station control information for controlling a response to the connection request from the terminal station that is not indicated by the connected terminal station information, and a connection determination unit that determines, based on each of the connected terminal station information and the base station control information, whether or not the connection request from the terminal station that is not indicated by the connected terminal station information is to be refused. The control station transmits, when a predetermined condition is satisfied, to the base station, the base station control information indicating that the connection request from the terminal station that is not indicated by the connected terminal station information is to be refused.

3 Claims, 5 Drawing Sheets

| TERMINAL STATION NUMBER | MAC ADDRESS | ... |
|---|---|---|
| 1 | AA:AA:AA:AA:AA:AA | ... |
| 2 | BB:BB:BB:BB:BB:BB | ... |
| ⋮ | ⋮ | ⋮ |

| CONTROL EXECUTION TIMING | IMMEDIATELY |
|---|---|
| CONNECTION CONTROL | ON |
| NEW CONNECTION | PERMITTED |
| NEW-TERMINAL-STATION DETERMINATION PERIOD | 10 SECONDS |
| NUMBER OF TIMES OF NEW-TERMINAL-STATION DETERMINATION | TWICE |
| ⋮ | ⋮ |

Fig. 6

| CONTROL EXECUTION TIMING | IMMEDIATELY |
|---|---|
| CONNECTION CONTROL | OFF |
| NEW CONNECTION | — |
| NEW-TERMINAL-STATION DETERMINATION PERIOD | — |
| NUMBER OF TIMES OF NEW-TERMINAL-STATION DETERMINATION | — |
| ⋮ | ⋮ |

WIRELESS COMMUNICATION SYSTEM, BASE STATION, AND WIRELESS COMMUNICATION METHOD

CROSS-REFERENCE TO RELATED APPLICATIONS

This application is a National Stage application under 35 U.S.C. § 371 of International Application No. PCT/JP2019/031063, having an International Filing Date of Aug. 7, 2019. The disclosure of the prior application is considered part of the disclosure of this application, and is incorporated in its entirety into this application.

TECHNICAL FIELD

The present invention relates a wireless communication system, a base station, and a wireless communication method.

BACKGROUND ART

There are various wireless communication systems each using an unlicensed band. For example, for a high-speed wireless access system using a radio wave in a 2.4 GHz band or a 5 GHz band, the IEEE802.11a standard and the IEEE802.11g standard achieve propagation speeds of up to 54 Mbit/s by using OFDM (Orthogonal Frequency Division Multiplexing) modulation (see, e.g., NPL 1).

Meanwhile, the IEEE802.11n standard achieves a propagation speed of up to 600 Mbits/s by using MIMO (Multiple Input Multiple Output) that uses a plurality of antennas to perform space-division multiplexing in the 2.4 GHz band or the 5 GHz band or a channel bonding technique that simultaneously uses two 20 MHz frequency channels to provide a 40 MHz frequency channel.

Also, the IEEE802.11ac standard achieves a propagation speed of up to 6900 Mbits/s by using a channel bonding technique that simultaneously uses up to eight 20 MHz frequency channels in the 5 GHz band as a channel at a frequency of up to 160 MHz, a multi-user MIMO technique that simultaneously propagates different signals to a plurality of destinations, or the like.

In a high-speed wireless access system using a radio wave in the 2.4 GHz band or the 5 GHz, when entering a communication area of a base station, a terminal station receives a beacon signal transmitted from the base station and thereby senses the presence of the base station in order to establish wireless connection to the base station. Then, the terminal station transmits a connection request signal including predetermined information (such as a connection network name, a connection method, and a connection authentication method) to the base station. Then, the base station responds to the connection request signal to establish the wireless connection.

When switching a wireless connection destination to another base station, the terminal station issues a wireless connection request to another base station, a wireless disconnection notification to the base station currently being connected to the terminal station, and the like.

CITATION LIST

Non Patent Literature

[NPL 1] IEEE Std 802.11-2016, December 2016.

SUMMARY OF THE INVENTION

Technical Problem

In an area in which a plurality of base stations are disposed, after a terminal station establishes wireless connection to any of the base stations, a radio propagation characteristic between the base station and the terminal station may significantly vary or, due to heavy interference traffic, it may be difficult for the terminal station to receive a radio signal such as the beacon signal from the base station.

In such a wireless environment, the terminal station may determine that a current wireless connection quality is poor and switch the wireless connection destination to another connectable base station therearound. When such switching repeatedly occurred, wireless communication disconnection frequently occurred.

In particular, in an environment in which a large number of users visit a site and make wireless connection such as in a stadium or an event space, it may be required to provide stable sessions (communication connection) to all the users.

For example, in a case where a predetermined period in an event is provided as a period for answering a questionnaire, when a wireless communication disconnection occurs, the questionnaire is to be answered again from the beginning, which may impair user experience. In other words, it is important to provide a stable wireless connection environment to the users.

An object of the present invention is to provide a wireless communication system, a base station, and a wireless communication method which can reduce disconnection of wireless communication of a terminal station at low control cost.

Means for Solving the Problem

A wireless communication system according to an aspect of the present invention is a wireless communication system including: a base station to which a plurality of terminal stations are connectable; and a control unit that controls the base station, the base station including: a collection unit that collects terminal station information indicating terminal stations each having issued a connection request to the base station; an information processing unit that causes a storage unit to store connected terminal station information indicating, among the terminal stations indicated by the terminal station information, the terminal station currently being connected to the base station; a network communication unit that receives, from the control station, base station control information for controlling a response to the connection request from the terminal station that is not indicated by the connected terminal station information; and a connection determination unit that determines, based on each of the connected terminal station information and the base station control information, whether or not the connection request from the terminal station that is not indicated by the connected terminal station information is to be refused, the control station transmitting, when a predetermined condition is satisfied, to the base station, the base station control information indicating that the connection request from the terminal station that is not indicated by the connected terminal station information is to be refused.

A base station according to the aspect of the present invention is a base station to which a plurality of terminal stations are connectable and which is controlled by a control station, the base station including: a collection unit that collects terminal station information indicating terminal stations each having issued a connection request to the base station; an information processing unit that causes a storage unit to store connected terminal station information indicating, among the terminal stations indicated by the terminal station information, the terminal station currently being connected to the base station; a network communication unit that receives, from the control station, base station control information for controlling a response to the connection request from the terminal station that is not indicated by the connected terminal station information; and a connection determination unit that determines, based on each of the connected terminal station information and the base station control information, whether or not the connection request from the terminal station that is not indicated by the connected terminal station information is to be refused.

A wireless communication method according to the aspect of the present invention is a wireless communication method for connecting a base station controlled by a control unit and a plurality of terminal stations, the wireless communication method including: a collection step of collecting terminal station information indicating terminal stations each having issued a connection request to the base station; an information processing step of causing a storage unit to store connected terminal station information indicating, among the terminal stations indicated by the terminal station information, the terminal station currently being connected to the base station; a reception step of receiving, from the control station, base station control information for controlling a response to the connection request from the terminal station that is not indicated by the connected terminal station information; a connection determination step of determining, based on each of the connected terminal station information and the base station control information, whether or not the connection request from the terminal station that is not indicated by the connected terminal station information is to be refused; and a transmission step of transmitting, when a predetermined condition is satisfied, to the base station, the base station control information indicating that the connection request from the terminal that is not indicated by the connected terminal station information is to be refused.

DESCRIPTION OF EMBODIMENTS

Figure 1:
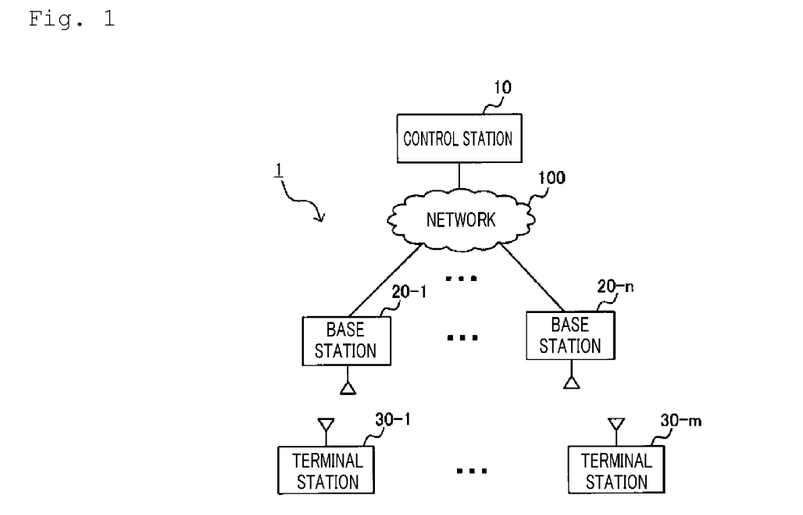
FIG. 1 is a diagram illustrating an example of a configuration of a wireless communication system according to an embodiment.

Referring to the drawings, an embodiment of a wireless communication system will be described below. FIG. 1 is a diagram illustrating an example of a configuration of a wireless communication system 1 according to the embodiment. As illustrated in FIG. 1, in the wireless communication system 1, e.g., a control station 10 and n (n is an integer of not less than 2) base stations 20-1 to 20-$n$ are connected via a network 100. Also, in the wireless communication system 1, with each of the base stations 20-1 to 20-$n$, m (m is an integer of not less than 2) terminal stations 30-1 to 30-$m$ are communicative.

In other words, each of the terminal stations 30-1 to 30-$m$ performs wireless communication with any one of the base stations 20-1 to 20-$n$. Unless any of a plurality of components, such as the base stations 20-1 to 20-$n$, is specified, each of the components is simply referred to in an abbreviated manner, such as the base station 20.

Figure 2:
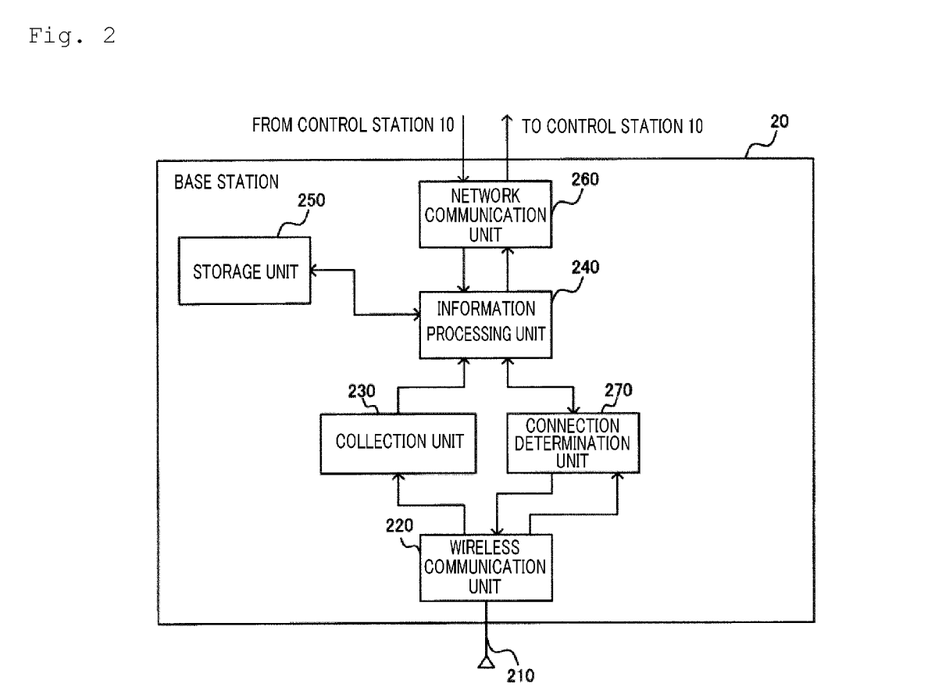
FIG. 2 is a diagram illustrating an example of a configuration of a base station according to the embodiment.

First, a description will be given of each of the base stations 20. FIG. 2 is a diagram illustrating an example of a configuration of the base station 20 according to the embodiment. As illustrated in FIG. 2, the base station 20 has an antenna 210, a wireless communication unit 220, a collection unit 230, an information processing unit 240, a storage unit 250, a network communication unit 260, and a connection determination unit 270. Note that, in FIG. 2, other functional blocks typically included in the base station are not illustrated.

The antenna 210 includes an antenna element that transmits/receives a radio wave and the like. The wireless communication unit 220 performs, via the antenna 210, transmission/reception of a radio signal to/from each of the terminal station 30 and another of the base stations 20. For example, the wireless communication unit 220 receives a connection request from the terminal station 30 or the like via the antenna 210 and outputs the received information to the collection unit 230 and to the connection determination unit 270. The wireless communication unit 220 also transmits, to the terminal station 30 and via the antenna 210, a response (described later) to a connection request input thereto from the connection determination unit 270.

The collection unit 230 collects, via the wireless communication unit 220, information about the terminal station 30 based on, e.g., the connection request from the terminal station 30 and outputs the collected information to the information processing unit 240.

Figure 3:
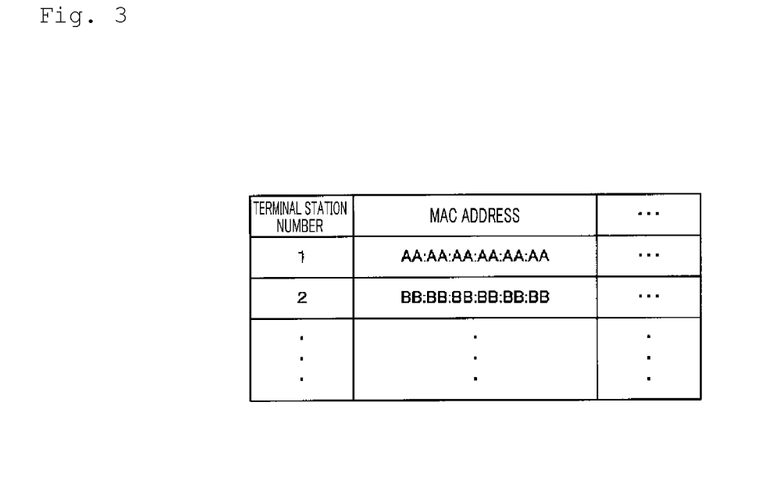
FIG. 3 is a diagram illustrating an example of terminal station information collected by a collection unit based on a connection request from a terminal station.

FIG. 3 is a diagram illustrating an example of terminal station information collected by the collection unit 230 based on the connection request from the terminal station 30. As illustrated in FIG. 3, the terminal station information includes information in which, e.g., terminal station numbers are added to respective MAC addresses of the individual terminal stations 30, which is assumed to be information that allows each of the terminal stations 30 having issued the connection requests to the base station 20 of concern to be specified.

The information processing unit 240 (FIG. 2) is connected to each of the collection unit 230, the storage unit 250, the network communication unit 260, and the connection determination unit 270 to perform information processing in the base station 20. For example, the information processing unit 240 acquires the terminal station information from the collection unit 230 and causes the storage unit 250 to store connected terminal station information indicating the terminal stations 30 currently connected to the host station such that the stored connected terminal station information is accessible.

Since the connected terminal station information is information obtained by selecting, from among the terminal stations 30 included in the terminal station information illustrated in FIG. 3, the terminal stations 30 currently connected to the base station 20, it is assumed that, e.g., a format of the information is the same as that of the terminal station information illustrated in FIG. 3.

The information processing unit 240 performs information processing based on information input thereto from the collection unit 230, the storage unit 250, and the connection determination unit 270 and performs transmission/reception of information to/from the control station 10 via the network communication unit 260.

The network communication unit 260 receives base station control information (described later using FIGS. 5 and 6) transmitted from the control station 10 and outputs the base station control information to the information processing unit 240. The network communication unit 260 also transmits, to the control station 10, control state information (information indicating a state of control based on the base station control information) output from the information processing unit 240.

The connection determination unit 270 acquires, from the information processing unit 240, the connected terminal station information and the base station control information and outputs, based on the connected terminal station information and the base station control information, a response to the connection request from the terminal station 30, which is input thereto from the wireless communication unit 220, to each of the wireless communication unit 220 and the information processing unit 240. The response to the connection request corresponds to a result of determining whether connection is to be permitted or refused.

For example, when the base station control information indicates fixation of the connection of the terminal station 30, the connection determination unit 270 determines that only the terminal stations 30 included in the connected terminal station information are connectable terminals and determines that connection requests from the other terminal stations 30 are to be refused. The fixation of connection permitted terminals is continued until the fixation is removed based on, e.g., the base station control information.

The connection determination unit 270 also measures the number of the connection requests issued from the terminal station 30 that is not indicated by the connected terminal station information within a predetermined period and determines that the connection requests from the terminal station 30 that has issued the connection requests the number of which is not less than a predetermined value (described later using FIGS. 5, 9, and the like) within the predetermined period are not to be refused.

Figure 4:
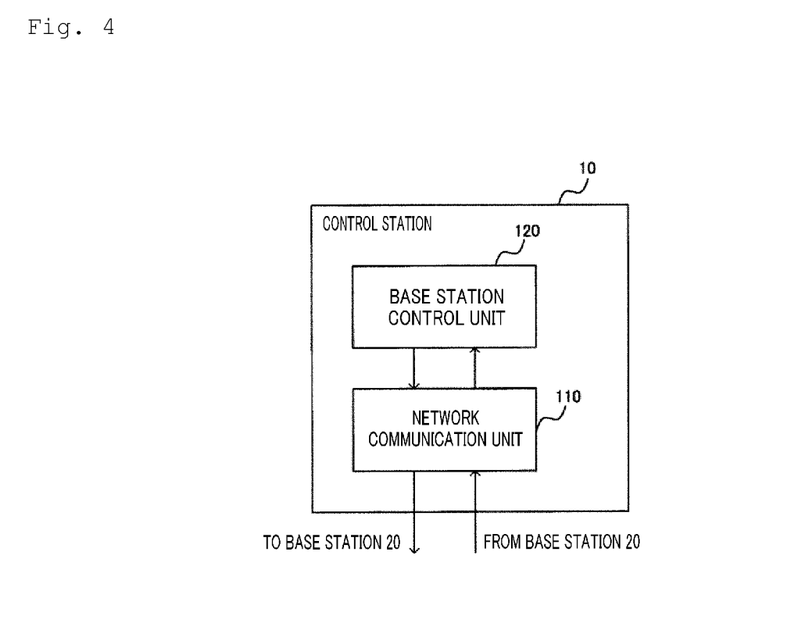
FIG. 4 is a diagram illustrating an example of a configuration of a control station according to the embodiment.

Next, a description will be given of the control station 10. FIG. 4 is a diagram illustrating an example of a configuration of the control station 10 according to the embodiment. As illustrated in FIG. 4, the control station 10 has a network communication unit 110 and a base station control unit 120. Note that, in FIG. 4, other functional blocks typically included in the control station are not illustrated.

The network communication unit 110 is an interface that receives information transmitted from each of the base stations 20-1 to 20-*n* and outputs the received information to the base station control unit 120 and transmits information input thereto from the base station control unit 120 to each of the base stations 20-1 to 20-*n*.

In a specific example, the network communication unit 110 receives the control state information described above from each of the base stations 20-1 to 20-*n* and outputs the control state information to the base station control unit 120. In the wireless communication system 1, the control station 10 transmits the base station control information output from the base station control unit 120 to the base stations 20-1 to 20-*n*.

When a predetermined condition is satisfied, the base station control unit 120 outputs the base station control information to the network communication unit 110. The base station control information is information indicating an operation (connection control) to be applied to the base station 20 when the predetermined condition is satisfied. For example, the base station control information is information indicating that the base station 20 should refuse the connection request from the terminal station 30 that is not indicated by the connected terminal station information or information for removing the application of the connection control.

In other words, the base station control information is information for turning ON/OFF an operation of fixing connection of the terminal stations 30 to each of the base stations 20 (i.e., continuously permitting the connection of only the terminal stations 30 being connected at that time and refusing connection of the other terminal stations 30) when the predetermined condition is satisfied.

As a result, the connected terminal station information is used as a so-called white list when the base station control information is information indicating the fixation of the terminal stations 30.

For example, when the predetermined condition is satisfied, the base station control information cooperates with a content server to fix the connection of each of the terminal stations 30 over a content delivery period. When the content server is a server that delivers a questionnaire, the connection of the terminal stations 30 is fixed during a period during which the questionnaire is received.

Figure 5:
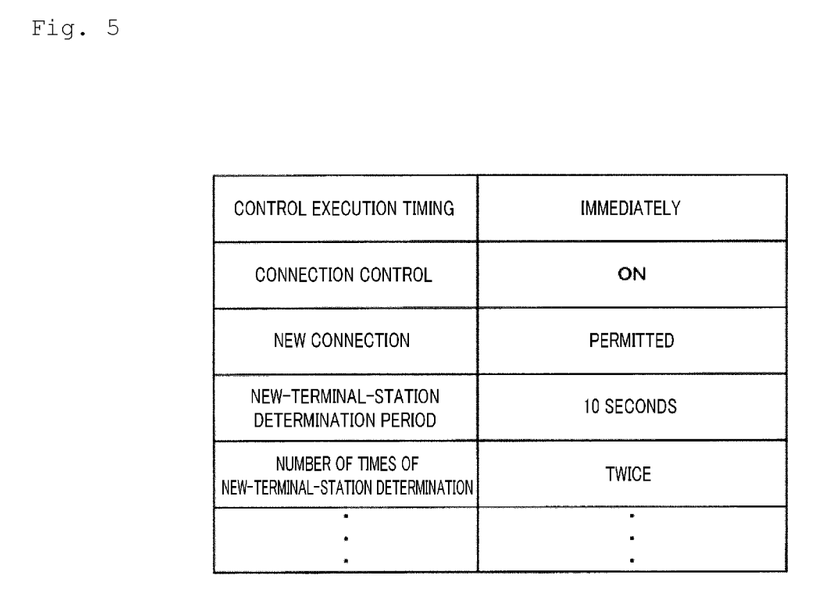
FIG. 5 is a diagram illustrating an example of base station control information transmitted from the control station to the base station to cause the base station to control connection from the terminal station.
Figure 6:
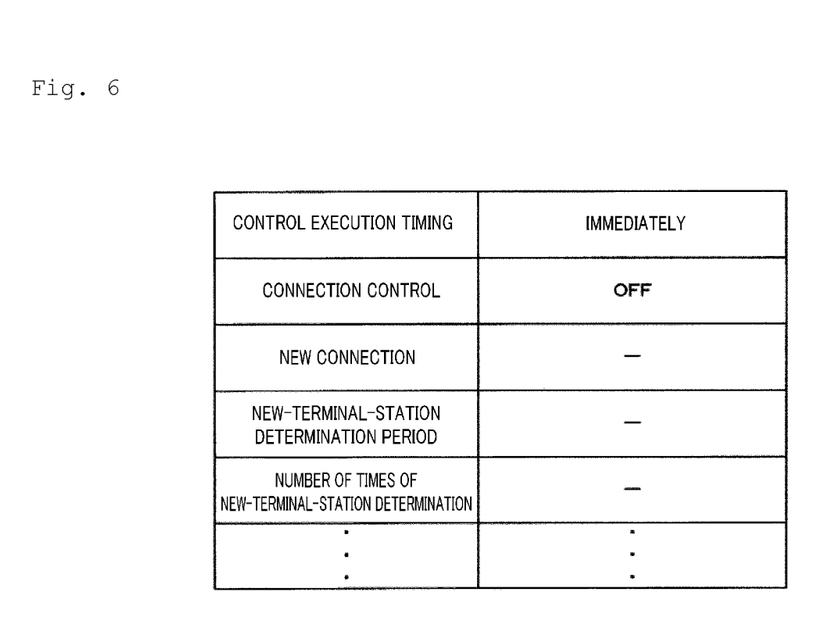
FIG. 6 is a diagram illustrating an example of base station control information transmitted from the control station to the base station to cause the base station to remove the connection control.

FIG. 5 is a diagram illustrating an example of the base station control information transmitted from the control station 10 to the base station 20 to cause the base station 20 to control the connection from the terminal station 30. FIG. 6 is a diagram illustrating an example of the base station control information transmitted from the control station 10 to the base station 20 to cause the base station 20 to remove the connection control.

The base station control information includes, e.g., information on control execution timing, information on the connection control, information on new connection, information on a new-terminal-station determination period, information on the number of times of new-terminal-station determination, and the like.

The information on the control execution timing is information indicating timing with which the base station 20 having received the base station control information executes details (fixation/removal) of the base station control information. For example, the information on the control execution timing serves as information that specifies immediately, execution date and time, or the like.

The information on the connection control is information indicating whether or not the base station 20 executes the connection control on the terminal station 30 that transmits the connection request (ON or OFF).

The information on the new connection is information indicating whether or not the terminal station 30 (new terminal station) that has attempted to be newly wirelessly connected after the base station 20 started the connection control is to be permitted to be connected.

The information on the new-terminal-station determination period is information indicating a condition for a period during which it is determined whether or not connection is to be permitted. The information on the number of times of new-terminal-station determination is information indicating a condition for the number of the issued connection requests.

In other words, the base station control information transmitted from the control station 10 to the base station 20 includes timing with which the connection control is to be executed, conditions for determination of new connection of the terminal station 30, and the like. This can reduce information to be managed by the control station 10 and allow the control station 10 to implement control on the base station 20 at low cost.

Note that timing with which the control station 10 performs control on the base station 20 may be based on predetermined date and time such as, e.g., a schedule in an event or may also be based on cooperation with another system.

For example, the wireless communication system 1 may also be configured to apply, based on information detected by a system that detects movement of people, the connection control to the base station 20 when the movement of people becomes not more than a predetermined value. The wireless communication system 1 may also be configured to apply, based on information output from an illumination system in a site of the event, the connection control to the base station 20 when illuminance of illumination becomes less than a predetermined value.

Figure 7:
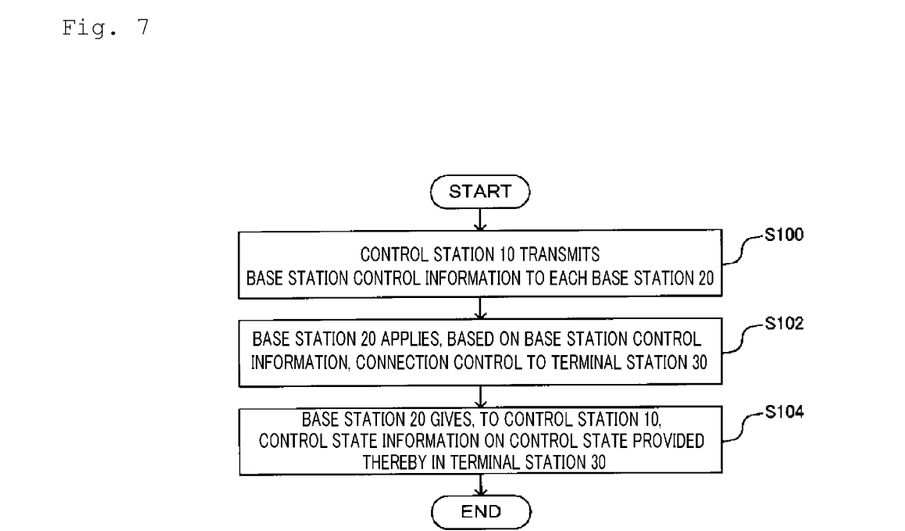
FIG. 7 is a flow chart illustrating an operation when the control station applies the connection control to the base station.

Next, a description will be given of an operation of the wireless communication system 1. FIG. 7 is a flow chart illustrating the operation when the control station 10 applies the connection control to the base station 20. As illustrated in FIG. 7, when the connection control is to be applied to the base station 20, the control station 10 transmits the base station control information (see FIG. 5) to each of the base stations 20 (S100).

The base station 20 applies, based on the base station control information, the connection control to the terminal station 30 (S102).

Then, the base station 20 gives, to the control station 10, the control state information on a control state provided thereby in the terminal station 30 (information indicating a state where the connection control is performed based on the base station control information) (S104).

Figure 8:
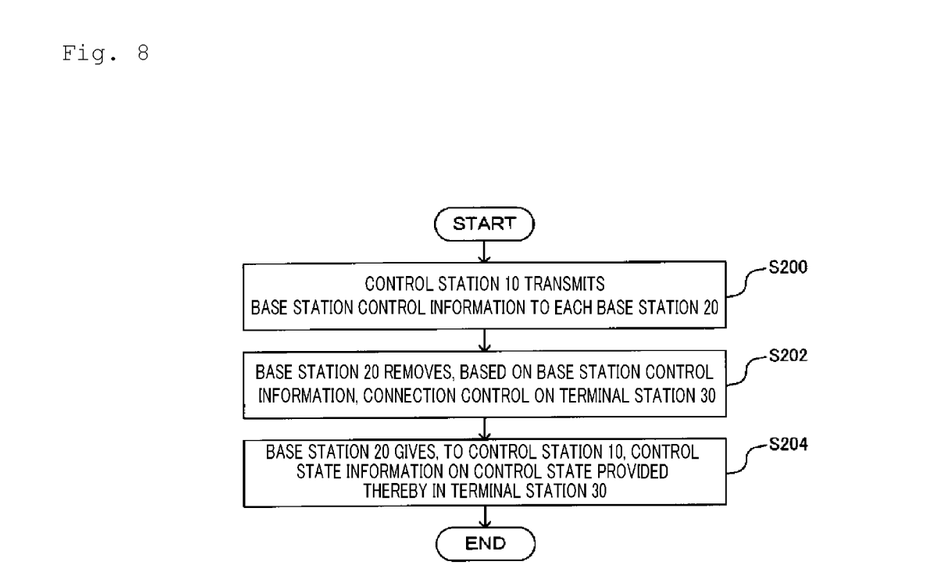
FIG. 8 is a flow chart illustrating an operation when the control station removes the connection control from the base station.

FIG. 8 is a flow chart illustrating an operation when the control station 10 removes the connection control from the base station 20. As illustrated in FIG. 8, when the connection control is to be removed from the base station 20, the control station 10 transmits the base station control information (see FIG. 6) to each of the base stations 20 (S200).

The base station 20 removes, based on the base station control information, the connection control on the terminal station 30 (S202).

Then, the base station 20 gives, to the control station 10, the control state information on a control state provided thereby in the terminal station 30 (information indicating a state where the connection control is removed based on the base station control information) (S204).

Figure 9:
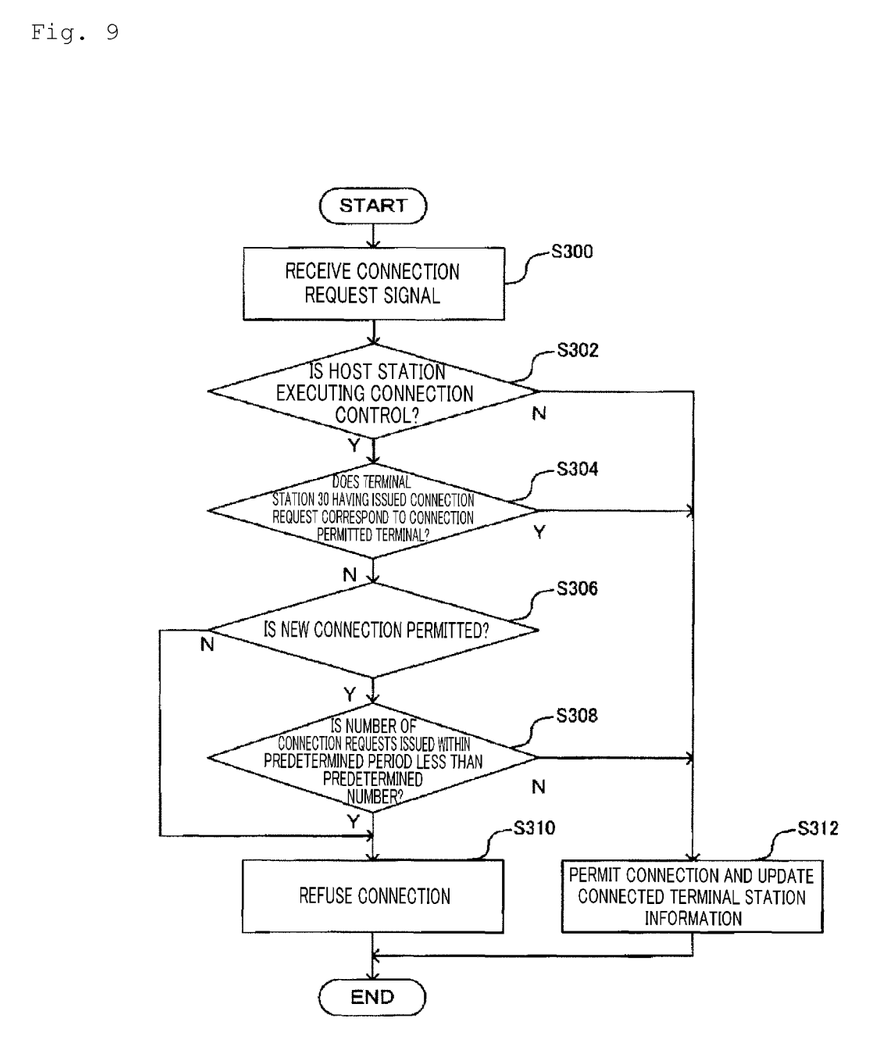
FIG. 9 is a flow chart illustrating an operation of the wireless communication system when the terminal station has issued the connection request to the base station.

Next, a description will be given of a specific example of the connection control when the terminal station 30 issues the connection request to the base station 20. FIG. 9 is a flow chart illustrating the operation of the wireless communication system 1 when the terminal station 30 has issued the connection request to the base station 20.

When receiving a connection request signal (S300), the base station 20 determines whether or not the base station 20 is executing the connection control (S302). When executing the connection control (Yes in S302), the base station 20 advances to processing in S304. When not executing the connection control (No in S302), the base station 20 advances to processing in S312.

The base station 20 refers to the MAC addresses in the connected terminal station information and determines whether or not the terminal station 30 that has issued the connection request corresponds to the connection permitted terminal (whether or not the terminal station 30 that has issued the connection request is the terminal station 30 included in the connected terminal station information) (S304). When determining that the terminal station 30 corresponds to the connection permitted terminal (Yes in S304), the base station 20 advances to processing in S312. When determining that the terminal station 30 does not correspond to the connection permitted terminal (No in S304), the base station 20 advances to processing in S306.

The base station 20 also determines whether or not the base station 20 is permitting new connection from the terminal station 30 (S306). When permitting new connection from the terminal station 30 (Yes in S306), the base station 20 advances to the processing in S308. When not permitting new connection from the terminal station 30 (No in S306), the base station 20 advances to processing in S310.

The base station 20 also refers to the base station control information (FIG. 5) and determines whether or not the number of the connection requests issued within the predetermined period (new-terminal-station determination period) is less than the predetermined number (number of times of new-terminal-station determination) (S308). When determining that the number of the connection requests issued within the predetermined period is less than the predetermined number (Yes in S308), the base station 20 advances to processing in S310. When determining that that the number of the connection requests issued within the predetermined period is not less than the predetermined number (No in S308), the base station 20 advances to processing in S312.

In the processing in S310, the base station 20 refuses to be connected to the terminal station 30 that has issued the connection requests.

Meanwhile, in the processing in S312, the base station 20 permits the terminal station 30 that has issued the connection requests to be connected thereto and updates the connected terminal station information.

In other words, even while the base station 20 is executing the connection control on the terminal station 30, the wireless communication system 1 permits the terminal station 30 that has issued the connection requests the number of which is not less than the predetermined number within the predetermined period to be connected. Thus, the wireless communication system 1 can prevent a situation in which the terminal station 30 that has newly issued the connection requests continues to be regarded as unconnectable.

Thus, the base station 20 can fix, based on a base station control signal transmitted from the control station 10, the terminal stations 30 that are connectable within the predetermined period and refuse to be connected to the terminal station 30 that newly issues the connection request. In other words, the wireless communication system 1 can stabilize the wireless connection destination of each of the terminal stations 30 at low control cost and reduce disconnection of wireless communication.

Note that the control station 10, the base stations 20, and the terminal stations 30 in the embodiment described above are not limited to those implemented by dedicated devices, and may also be implemented by a versatile computer. In this case, the control station 10, the base stations 20, and the terminal stations 30 may also be implemented by recording programs for implementing respective functions thereof on a computer readable recording medium and causing a computer system to read the programs recorded on the recording medium and execute the programs.

It is assumed that the "computer system" mentioned herein include hardware such as an OS and a peripheral device. The "computer-readable recording medium" refers to a portable medium such as a flexible disk, a magneto-optical disk, a ROM, or a CD-ROM or a storage device embedded in the computer system, such as a hard disk.

The "computer-readable recording medium" may also include a recording medium that dynamically retains a program for a short period of time such as a communication line when the program is to be transmitted via a network such as the Internet or a communication line such as a telephone line or include a recording medium that retains the program for a given period of time such as a volatile memory in a computer system serving as a server or client in that case.

Also, the program described above may be a program for implementing any of the functions described above, while the functions described above may be implemented by a combination of the program described above and a program already recorded in the computer system. The program described above may also be a program to be implemented using hardware such as a PLD (Programmable Logic Device) or a FPGA (Field Programmable Gate Array).

While the embodiment of the present invention has been described above with reference to the drawings, it is obvious that the embodiment described above is merely an example of the present invention, and the present invention is not limited to the embodiment described above. Therefore, additions, omissions, substitutions, and other modifications of the components may be performed without departing from the technical idea and scope of the present invention.

REFERENCE SIGNS LIST

1 Wireless communication system
10 Control station
20-1 to 20-$n$ Base stations
30-1 to 30-$m$ Terminal stations
100 Network
110 Network communication unit
120 Base station control unit
210 Antenna
220 Wireless communication unit
230 Collection unit
240 Information processing unit
250 Storage unit
260 Network communication unit
270 Connection determination unit

The invention claimed is:

1. A wireless communication system comprising:
a base station to which a plurality of terminal stations are connectable; and
a control station configured to control the base station,
the base station including one or more processors configured to:
   collect terminal station information indicating terminal stations each having issued a connection request to the base station;
   cause a storage unit to store connected terminal station information indicating, among the terminal stations indicated by the terminal station information, the terminal station currently being connected to the base station;
   receive, from the control station, base station control information for controlling a response to the connection request from the terminal station that is not indicated by the connected terminal station information; and
   determine, based on each of the connected terminal station information and the base station control information, whether or not the connection request from the terminal station that is not indicated by the connected terminal station information is to be refused,
the control station is configured to:
   transmit, when a predetermined condition is satisfied, to the base station, the base station control information indicating that the connection request from the terminal station that is not indicated by the connected terminal station information is to be refused; and
   transmit, to the base station, the base station control information indicating that the terminal station that has issued the connection requests the number of which is not less than a predetermined number within a predetermined period is to be permitted to be connected even when the terminal station is not indicated by the connected terminal station information.

2. A base station to which a plurality of terminal stations are connectable and which is controlled by a control station, the base station comprising one or more processors configured to:
   collect terminal station information indicating terminal stations each having issued a connection request to the base station;
   cause a storage unit to store connected terminal station information indicating, among the terminal stations indicated by the terminal station information, the terminal station currently being connected to the base station;
   receive, from the control station, base station control information for controlling a response to the connection request from the terminal station that is not indicated by the connected terminal station information;
   determine, based on each of the connected terminal station information and the base station control information, whether or not the connection request from the terminal station that is not indicated by the connected terminal station information is to be refused; and
   measure the number of the connection requests issued from the terminal station that is not indicated by the connected terminal station information within a predetermined period and determine that the connection requests from the terminal station that has issued the connection requests the number of which is not less than a predetermined value within the predetermined period are not to be refused.

3. A wireless communication method for connecting a base station controlled by a control station and a plurality of terminal stations, the wireless communication method comprising:
    collecting terminal station information indicating terminal stations each having issued a connection request to the base station;
    causing a storage unit to store connected terminal station information indicating, among the terminal stations indicated by the terminal station information, the terminal station currently being connected to the base station;
    receiving, from the control station, base station control information for controlling a response to the connection request from the terminal station that is not indicated by the connected terminal station information;
    determining, based on each of the connected terminal station information and the base station control information, whether or not the connection request from the terminal station that is not indicated by the connected terminal station information is to be refused;
    transmitting, when a predetermined condition is satisfied, to the base station, the base station control information indicating that the connection request from the terminal that is not indicated by the connected terminal station information is to be refused; and
    transmitting, to the base station, the base station control information indicating that the terminal station that has issued the connection requests the number of which is not less than a predetermined number within a predetermined period is to be permitted to be connected even when the terminal station is not indicated by the connected terminal station information.

* * * * *